C. C. BLAKE.
ADHESIVE JOINT.
APPLICATION FILED NOV. 13, 1915. RENEWED APR. 10, 1918.

1,284,859.

Patented Nov. 12, 1918.

Inventor
Charles C. Blake
by Charles W. McDermott
his attorney

UNITED STATES PATENT OFFICE.

CHARLES C. BLAKE, OF BROOKLINE, MASSACHUSETTS, ASSIGNOR TO C. C. BLAKE INCORPORATED, OF BOSTON, MASSACHUSETTS, A CORPORATION OF NEW YORK.

ADHESIVE JOINT.

1,284,859. Specification of Letters Patent. Patented Nov. 12, 1918.

Application filed November 13, 1915, Serial No. 61,381. Renewed April 10, 1918. Serial No. 227,824.

*To all whom it may concern:*

Be it known that I, CHARLES C. BLAKE, a citizen of the United States, residing at Brookline, in the county of Norfolk and State of Massachusetts, have invented a new and useful Improvement in Adhesive Joints, of which the following is a specification.

The present invention relates to adhesive joints by means of which separate pieces of material are connected.

In one method of making adhesive joints the parts to be joined are coated with a liquid adhesive and then the coated parts are pressed together until the joint is made. This method is wasteful of the adhesive and also causes considerable annoyance owing to the difficulty of keeping the exposed surfaces of the joined parts clean. A better method of making adhesive joints is to coat one or both of the parts to be joined with a normally non-tacky adhesive, press the parts together, and render the adhesive tacky by the application of heat to one or both of the exposed surfaces of the parts. While the second method is a better method than the first method for many uses the second method cannot be employed as the application of heat to the exposed surfaces of the parts to be joined damages the material.

In the method of lasting shoes devised by me the upper is first updrawn, then the updrawn upper is bound and clamped against the edge face of the sole on the last, and finally a coating of liquid cement is interposed between the edge face of the sole and the upper for the purpose of securing the upper to the edge face of the sole. In order to effect an economy in the use of the cement and also to obviate all danger of soiling the upper of the shoe it has been proposed to provide the edge face of the sole with a coating of the type hereinbefore referred to which is normally non-adhesive under ordinary conditions of temperature but which is capable of being rendered tacky under the influence of heat. After the upper was updrawn it was then proposed to secure the updrawn upper to the edge face of the insole by applying heat and pressure to the exposed face of the upper. The heat penetrated the upper and rendered the adhesive coating on the insole tacky so that a good joint was made by this method. Unfortunately the upper was damaged by the application of heat to its exposed face so that the practice of this method had to be abandoned.

The object of the present invention is to provide a novel adhesive joint, having all the advantages of the second adhesive joint hereinbefore referred to, which may be formed without injury to the materials of the parts to be joined.

To the accomplishment of this object and such others as may hereinafter appear the features of the present invention relate to certain devices, combinations and arrangements of parts, hereinafter described and then set forth broadly and in detail in the appended claims, which possess advantages readily apparent to those skilled in the art.

The various features of the present invention will be best understood from an inspection of the accompanying drawings illustrating the best form of the invention at present known to the inventor, in which, Figure 1 is a plan of an insole for a welt shoe which is to be connected to an upper;

Figure 1:
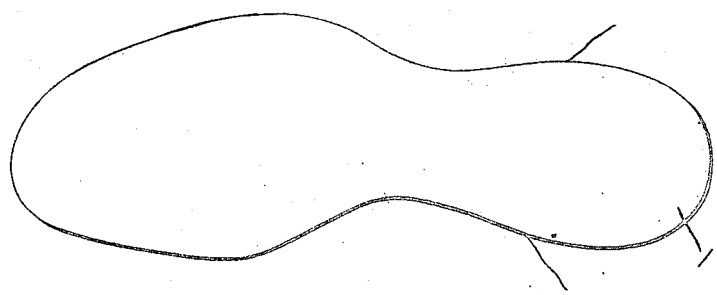
Figure 2:
Fig. 2 is a lateral sectional elevation of the insole.
Figure 3:
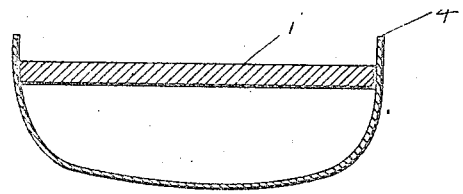
Fig. 3 is a lateral sectional elevation of a lasted welt shoe.

Referring now to the drawings an insole 1 is provided along its edge face with a coating 2 (Figs. 2 and 3) in which is embedded a conductor 3, hereinafter termed a thermal conductor, for transmitting force, such as heat or electricity. While the thermal conductor may be a tube for transmitting steam, hot air or other heating medium it is preferred to employ a wire of heat-producing resistance for conducting electricity. The coating may be jewelers' cement, sealing wax or some other of the well known normally non-tacky adhesives all of which are non-conductors. The insole is secured to a last in the usual way, or in accordance with the method described in the application for Letters Patent of the United States, filed by me September 16, 1915, Serial No. 51,099, and an upper 4 is then updrawn in the manner illustrated in Fig. 3. The updrawn upper is then firmly pressed against the edge face of the insole and a current of electricity passed through the wire 3. As the wire has a high resistance it soon becomes red hot whereupon the coating 2 is rendered tacky thus making a tight joint between the insole and upper. With this adhesive joint the heat is applied directly to the contacting faces of the parts to be joined thus obviating all danger of damage resulting to the material of the parts. As the wire employed is very fine it may be allowed to remain in the joint with safety.

While the illustrated embodiment of the present invention is directed to an improved adhesive joint for connecting the upper and sole of a shoe it is not to be understood as limiting the scope of the claims, where the context otherwise permits, to the exclusive use of the adhesive joint in the manufacture of shoes, as it will be apparent to those skilled in this and other arts that the adhesive joint herein disclosed may be advantageously employed in the manufacture of many kinds of articles.

It will be clear to those skilled in this art, and with the general objects of the present invention in view, that changes may be made in the details of structure, the described and illustrated embodiment thereof being intended as an exploitation of its underlying essentials, the features whereof are definitely stated in their true scope in the claims herewith.

What is claimed as new, is:—

1. In combination, two members having interposed therebetween an adhesive which is normally non-adhesive but which is rendered tacky under the influence of heat and a thermal conductor for melting the adhesive to join the members, substantially as described.

2. In combination, two members having interposed therebetween an adhesive-covered thermal conductor, the adhesive being normally non-adhesive but rendered tacky under the influence of heat conducted by the conductor, substantially as described.

3. An adhesive joint comprising two members having an adhesive on their contacting faces, and a source of heat applied directly to the contacting faces of the members, substantially as described.

4. A sole having an adhesive coating which is normally non-adhesive but which is rendered tacky under the influence of heat thereon and a wire embedded in the adhesive coating, substantially as described.

5. A sole provided with an adhesive-covered wire on its edge face, said adhesive being normally non-adhesive but rendered tacky under the influence of heat, substantially as described.

6. An assembled shoe, having in combination, a sole and an upper having interposed therebetween an adhesive which is normally non-adhesive but which is rendered tacky under the influence of heat and a thermal conductor, substantially as described.

7. An assembled shoe, having, in combination, a sole and an upper having interposed therebetween an adhesive-covered thermal conductor, the adhesive being normally non-adhesive but rendered tacky under the influence of heat conducted by the conductor, substantially as described.

8. A lasted shoe, having, in combination, a sole provided with an adhesive which is normally non-adhesive but which is rendered tacky under the influence of heat and a thermal conductor, and an upper secured to the sole by the adhesive, substantially as described.

9. A lasted shoe, having, in combination, a sole provided along its edge face with an adhesive which is normally non-adhesive but which is rendered tacky under the influence of heat and a thermal conductor, and an upper secured to the edge face of the sole by the adhesive, substantially as described.

10. A sole having its edge face coated with an adhesive which is normally non-adhesive but which is rendered tacky under the influence of heat and a thermal conductor embedded in the adhesive, substantially as described.

11. A sole having a solid edge face coated with an adhesive which is normally non-adhesive but which is rendered tacky under the influence of heat, and a wire embedded in the adhesive, substantially as described.

CHARLES C. BLAKE.

Copies of this patent may be obtained for five cents each, by addressing the "Commissioner of Patents, Washington, D. C."